US006961851B2

(12) United States Patent
Burritt et al.

(10) Patent No.: US 6,961,851 B2
(45) Date of Patent: Nov. 1, 2005

(54) METHOD AND APPARATUS FOR PROVIDING COMMUNICATIONS SECURITY USING A REMOTE SERVER

(75) Inventors: David R. Burritt, Broomfield, CO (US); Matthew J. Stevens, Northglenn, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 802 days.

(21) Appl. No.: 09/912,125

(22) Filed: Jul. 23, 2001

(65) Prior Publication Data
US 2003/0018901 A1 Jan. 23, 2003

(51) Int. Cl.[7] .................................................. H04L 9/00

(52) U.S. Cl. .................... 713/168; 713/185; 713/191

(58) Field of Search ............................... 713/168, 172, 713/182, 185, 150, 191, 159, 201

(56) References Cited

U.S. PATENT DOCUMENTS

| | | | |
|---|---|---|---|
| 5,491,752 A | | 2/1996 | Kaufman ...................... 380/30 |
| 5,706,349 A | * | 1/1998 | Aditham et al. ............. 713/159 |
| 5,978,918 A | * | 11/1999 | Scholnick et al. ........... 713/201 |
| 6,058,187 A | * | 5/2000 | Chen ........................... 713/170 |
| 6,061,741 A | | 5/2000 | Murphy, Jr. et al. ........ 709/248 |
| 6,122,631 A | | 9/2000 | Berbec et al. ................ 707/9 |
| 6,681,252 B1 | * | 1/2004 | Schuster et al. ............ 709/227 |

* cited by examiner

Primary Examiner—Matthew Smithers
(74) Attorney, Agent, or Firm—Sheridan Ross P.C.

(57) ABSTRACT

A communications system featuring a remote security server is provided. The system allows the validation of requests for access to a communications network to be performed in a centralized security server. The use of a security server allows security features to be implemented, without the need to distribute a security algorithm to individual client devices. In addition, changes to the security algorithm can easily be made, because such changes need only be made in the security server itself, and in the communications server to which access is desired. The present invention is particularly useful in connection with communication services provided as part of a private branch exchange.

21 Claims, 3 Drawing Sheets

METHOD AND APPARATUS FOR PROVIDING COMMUNICATIONS SECURITY USING A REMOTE SERVER

FIELD OF THE INVENTION

The present invention generally relates to communications security. In particular, the present invention relates to providing security for a communications network using an encryption algorithm that is remote from a communications device.

BACKGROUND OF THE INVENTION

Communications security is of increasing concern. Often, computers communicate over a network by passing encrypted data to one another. The encryption of data allows computer systems to verify the source of data, and to protect data from eavesdropping while that data is in transit. Encryption is typically performed using encryption keys or encryption key pairs in combination with an encryption algorithm. Data encrypted using an encryption algorithm in connection with a unique key prevents an eavesdropper from easily accessing the encrypted data. In addition, such encryption provides a way for a receiving computer to validate the source of the encrypted data, because presumably only authorized computers possess the key necessary to encrypt data in such a way that it can be decrypted by the receiving computer. Accordingly, data encryption can be used in connection with providing security to a communications network or to applications associated with such a network.

The use of mobile computers, such as laptops and personal digital assistants (PDAs) is becoming increasingly widespread. Such devices are useful in providing users with a connection to network services even when the user is away from the user's full-featured desktop computer. Such devices can also be used to provide telephony services even when the user is away from the user's desk top telephone. For example, IP telephony allows computers, to function as voice communication devices using computer networks as a transmission medium.

However, the use of data encryption in connection with mobile devices can be problematic. For example, such devices may not feature the resources found in a typical desktop computer. Therefore, the ability of such devices to run certain security algorithms is limited. In addition, the easy portability of such devices makes those devices, and any programming code stored in them, vulnerable to theft. Additionally, the distribution of security algorithms to a number of computer devices increases the risk that the code used to implement those algorithms will be circumvented. In addition, where alterations to the security algorithm are necessary (for example, when the original algorithm has been hacked or to update or increase the security of the algorithm), it can be extremely difficult to provide the modified algorithm to all of the devices that need access to the secured features of a network.

SUMMARY OF THE INVENTION

The present invention is directed to solving these and other problems and disadvantages of the prior art. Generally, according to the present invention, a security server is provided for controlling access to applications or communications systems. According to the present invention, the security server contains the security algorithm used to encrypt data in connection with validating a request for access to an application or a communications system protected by the security server.

According to one embodiment of the present invention, the security server contains software that includes an encryption algorithm, and is interconnected to a local area network (LAN). The LAN is generally used to pass communications between a computer or communications device requesting access to a protected application or communications system and the security server. Also interconnected to the LAN is an application server or a communications server through which the desired application or communications service may be accessed. Accordingly, the LAN is also used to pass communications between the communications device and the communications server.

In order to obtain access to the application or communication service, the communications device requesting access may send its request to the communications server over the LAN. In response, the communications server may issue a token to the communications device. The communications device requesting access may then pass the token to the security server together with a password and a user identifier. The user password and identifier may be encrypted using A simple encryption algorithm provided on the communications device. The security server, having received the token and password, then encrypts the token using the password as an encryption key. The security server sends the encrypted token to the communications device requesting access, which forwards the encrypted token to the communications server. The communications server may then decrypt and validate the token. If the token matches the original token sent from the communications server, the requested access is granted.

According to another embodiment of the present invention, the user interconnects to a computer network, such as a LAN, using a communications device configured to provide an Internet Protocol (IP) telephone. In response to a request that a telephone extension of a communications system be transferred to the communications device, the communications server passes a token to the communications device. The communications device then provides the token and a password to a security server also connected to the LAN. The security server encrypts the token, using the password as the encryption key, and returns the encrypted token to the communications device. The communications device then passes the encrypted token to the communications server. The communications server decrypts the token. If the password and encryption algorithm used to encrypt the token are valid, the decrypted token will be identical to the token originally sent from the communications server to the communications device. If the decrypted token matches the token originally sent by the communications server, the requested telephone extension is transferred to the communications device.

In accordance with a further embodiment of the present invention, when access to a telephone extension provided as part of a communications system is granted, the requesting communications device is provided with all of the features available to a user through the transferred extension. For example, with the communications device the user can dial from the transferred extension, and can access all of the features available from, for example, the user's desk telephone from which the extension normally associated with the user's desk telephone is transferred.

These and other advantages and features of the invention will become more apparent from the following description of an illustrative embodiment of the invention taken together with the drawings.

DETAILED DESCRIPTION

Figure 1:
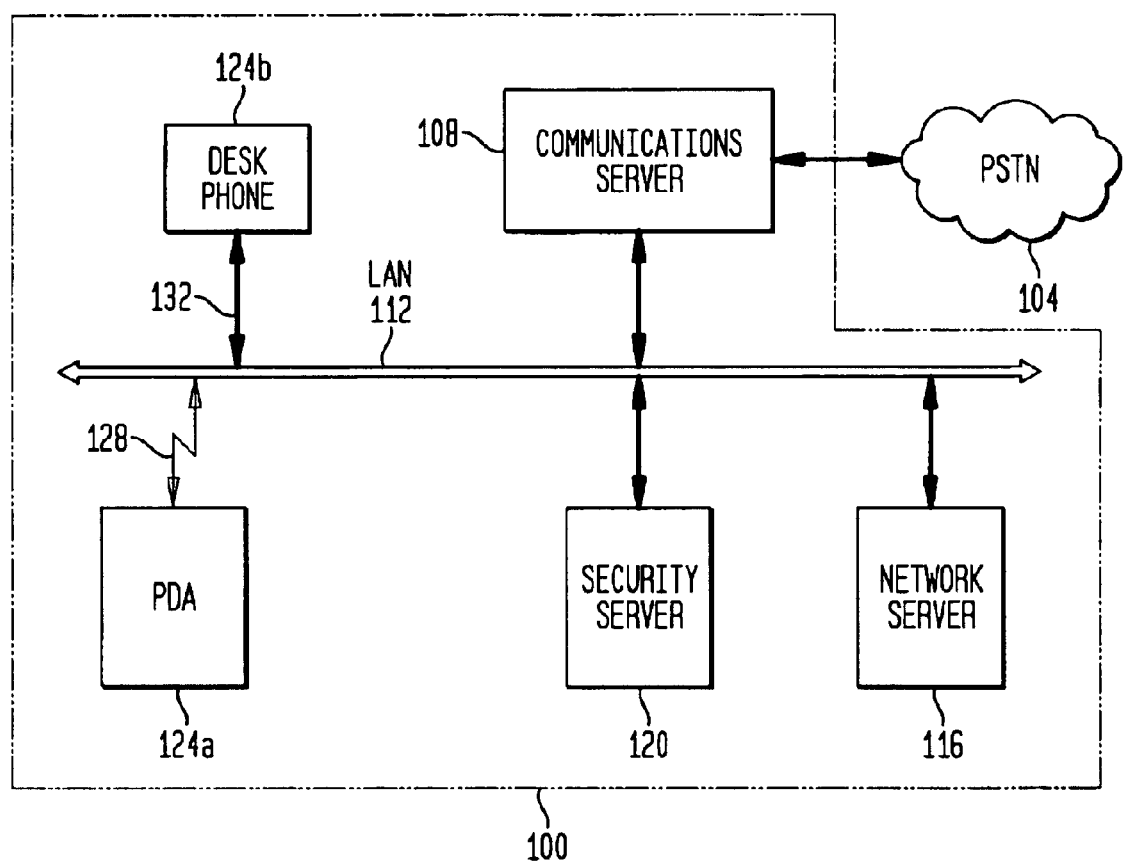
FIG. 1 is a block diagram of a computer network that includes a security server in accordance with an embodiment of the present invention.

FIG. 1 illustrates a computer network 100 interconnected to the public switched telephone network 104. In general, the computer network 100 includes an application or communications server 108 in communication with the public switched telephone network 104 (PSTN) and a local area network 112. According to one embodiment of the present invention, the communications server 108 is a private branch exchange (PBX) server, such as the DEFINITY® server available from the assignee of the present invention. A network server 116 may be interconnected to the LAN 112 for controlling functions related to the LAN 112, such as controlling access to the LAN 112. A security server 120 is also interconnected to the LAN 112.

A plurality of computers or communications devices 124 may also be interconnected to the LAN 112. For example, a first communications device 124a labeled personal digital assistant (PDA) in FIG. 1, and a second communications device 124b, labeled desk telephone in FIG. 1, may be interconnected to the LAN 112. Furthermore, the communications devices 124 may be interconnected to the LAN 112 in a variety of ways. For example, the first communications device 124a is interconnected to the LAN 112 via a wireless extension 128 of the LAN 112 (also referred to herein as wireless LAN 128), while the second communications device 124b is interconnected to the LAN 112 by a wired interconnection 132.

According to an embodiment of the present invention, each of the communications devices 124 are provided with a speaker, a microphone, and application programming enabling those devices 124 to be utilized as Internet Protocol (IP) telephones. Accordingly, the communications devices 124 can be used in connection with voice communications that are carried at least in part over the LAN 112. Furthermore, the communications devices 124 can be used to place voice telephone calls that are carried at least in part over the PSTN 104. Accordingly, the communications devices 124 may utilize a voice over IP (VoIP) protocol, such as the H.323 stack, for transferring voice communications over the LAN 112. According to still another embodiment of the present invention, one or both devices may be provided with a reduced H.323 stack. For example, the devices 124 may be provided with only those portions of the H.323 stack that are required to perform all or a plurality of the functions available in connection with the communications server 108. The provision of a reduced H.323 stack is particularly useful in connection with devices such as personal digital assistants (e.g., first communications device 124a) in which the available memory is limited.

The second computing device 124b may be an IP telephone. For example, the second communications device 124b may include a desk top telephone interconnected to a private branch exchange provided in connection with the LAN 112 and the communications server 108. As will be appreciated by one of skill in the art, the desktop telephone 124b may have available to it a variety of features, including the ability to answer calls placed to an associated extension; to place a call; to dial digits over an existing call; to hang up a call; to place a call on hold; to transfer a call; to place a conference call; to display caller information; to display the name of the caller; to allow the user to screen pop into the directory database application; to store information such as the name, number, time, date, duration, etc. on all calls in the log database; to allow the user to take notes that can be stored with other information regarding the call in the log database; to handle multiple call appearances; to press buttons that are administered for the station; to display state information; to display voice mail and message status; to adjust volume level; to allow dial pad capabilities; and to allow the user to rename the features downloaded from the communications server 108.

The PDA 124a may also have access to the communications features provided by the communications server 108. In accordance with one embodiment of the present invention, the PDA is granted access to the features associated with the second communications device 128b after a properly encrypted token is received at said first communications device. For example, the first communications device 124a may be granted access to a telephone extension, and any standard or customized features created in connection with that telephone extension, that are normally associated with the second communications device 124b, as will be described in greater detail below.

Figure 2:
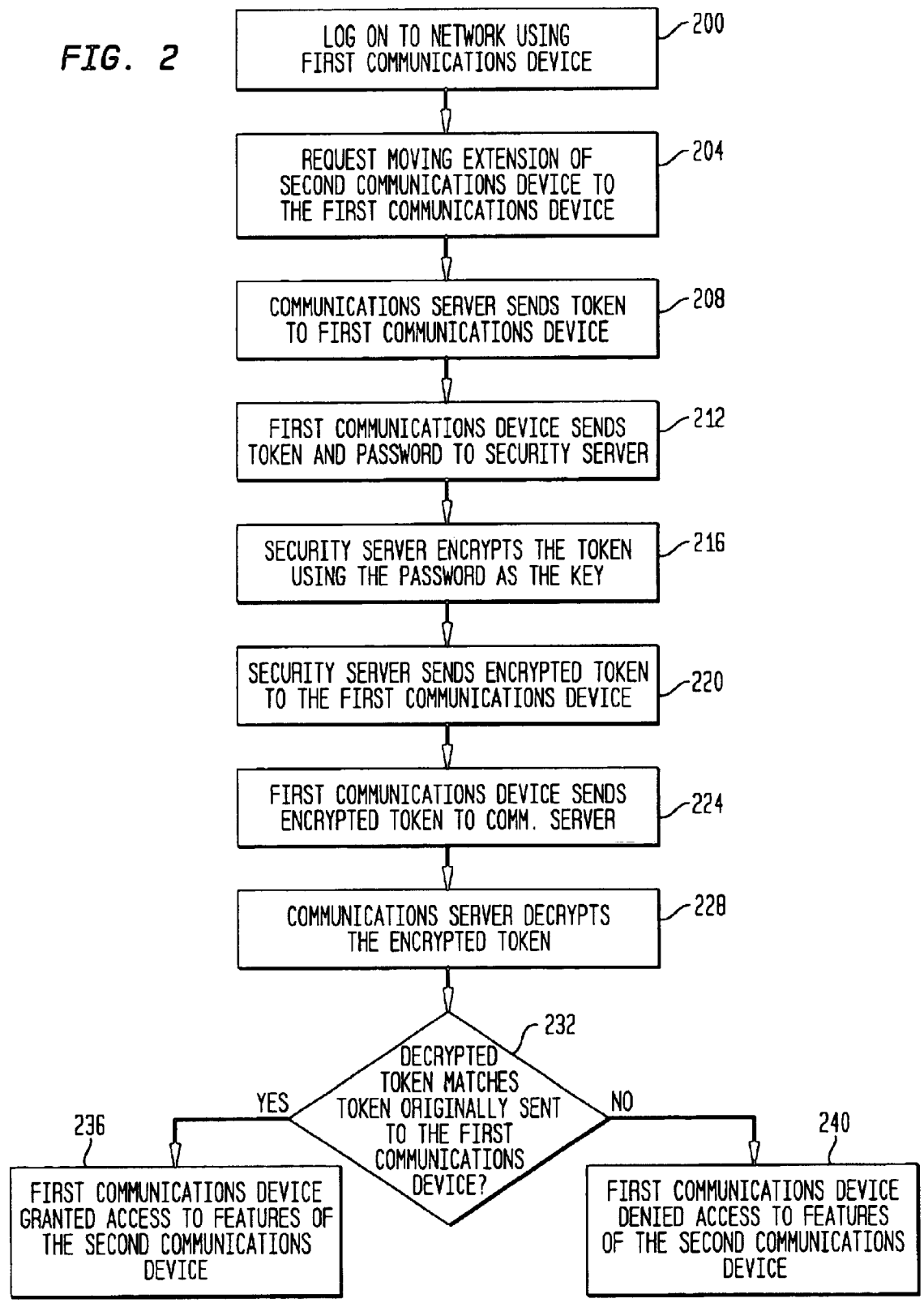
FIG. 2 is a flowchart illustrating the operation of an embodiment of the present invention.

With reference now to FIG. 2, the operation of a system 100 provided in accordance with an embodiment of the present invention will be explained. Initially, at step 200, a user logs onto the network 112 using the first communications device 124a. With respect to the example of FIG. 1, logging onto the network 112 may include establishing a connection with the local area network 112 over a wireless extension 128 of the LAN 112. Furthermore, logging onto the LAN 112 may include providing user identifier information, such as a login name and password. As will be appreciated by one of skill in the art, the network server 116 generally controls access to the LAN 112. Thus, the network server 116, upon receipt of the user name and password, can determine whether to grant access to the LAN 112 by the communications device 124a.

After successfully logging on to the LAN 112, the first communications device 124a requests moving a telephone extension assigned to the second communications device 124b to the first communications device 124a (step 204). In response to the request to move the telephone extension, the communications server 108 sends a token to the first communications device 124a (step 208). In general, before a communications device 124 is granted access to the features of the communications server 108, the token must be properly validated and returned to the communications server 108. In order to validate the token, the first communications device 124a sends the token, a password, and a user identifier, such as a login name, to the security server 120 (step 212). The password and user identifier may be encrypted using a simple encryption algorithm provided on the first communications device 124a before they are sent to the security server 120, in which case the security server decrypts the password and user identifier upon receiving them. The security server 120 then encrypts the token using the password as the key (step 216).

The security server 120 next sends the encrypted token to the first communications device 124a (step 220). The first communications device then sends the encrypted token to the communications server 108 (step 224). Accordingly, it can be appreciated that the token appears to have been encrypted (or validated) by the first communications device 124*a* itself. However, the encryption algorithm used to validate the token is not stored on the first communications device 124*a*. Instead, the encryption algorithm is stored on the security server 120.

The communications server 108 decrypts the encrypted token (step 228). In general, the communications server 108 is able to decrypt the token because it has been provided with a decryption algorithm complimenting the algorithm used to encrypt the token. Also, the communications server 108 has knowledge of the password. Accordingly, if the password provided from the first communications device 124*a* and the encryption algorithm used to validate the token are both valid, the decrypted token will match the token originally provided to the first communications device 124*a*. At step 232, the communications server 108 determines whether the decrypted token in fact matches the token originally provided to the first communications device 124*a*. If the tokens match, the extension assigned to the second communications device 124*b* is transferred to the first communications device 124*a*, and the first communications device 124*a* is granted access to the features associated with that extension, and that had been accessible through the second communications device 124*b* (step 236). If the decrypted token does not match the token as it was originally provided to the first communications device 124*a*, the first communications device 124*a* is denied access to the features associated with the telephone extension identified at step 204, and the telephone extension is not transferred (step 240).

Figure 3:
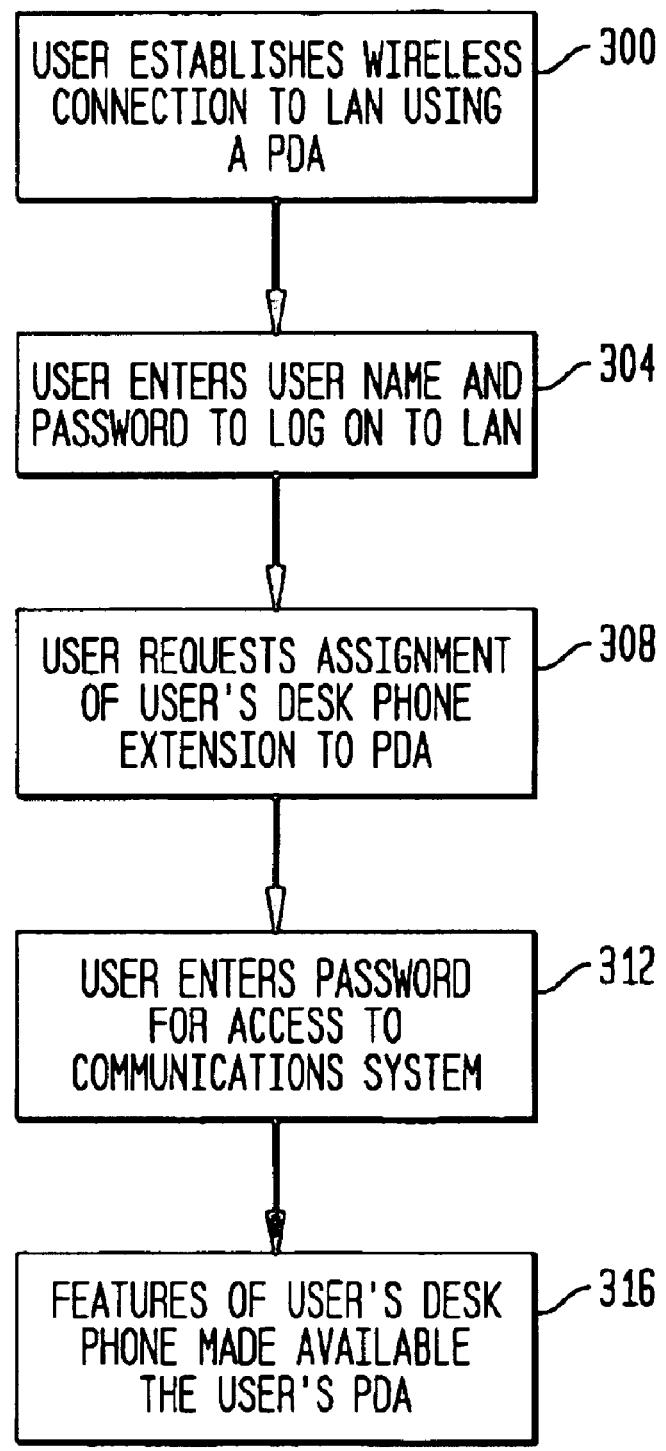
FIG. 3 is a flowchart illustrating the transfer of a telephone extension in accordance with an embodiment of the present invention.

With reference now to FIG. 3, the steps taken by a user to transfer a telephone extension in connection with an embodiment of the present invention are illustrated. Initially, at step 300, the user establishes a wireless connection to the local area network 112 using a PDA 124*a*. Next, the user enters a user name and password to log on to the LAN 112 (step 304). As noted above, the network server 116 is generally operative to control access to the LAN 112. Accordingly, the network server 116 determines whether the user name and password are valid. If the user name and password are valid, the PDA 124*a* is allowed to communicate to other devices over the LAN 112.

At step 308, the user requests the assignment of the user's desk telephone extension to the PDA 124*a*. For example, the user may request that the extension assigned to the desk telephone 124*b* be transferred to the PDA 124*a*. In general, the features of one IP telephone may be transferred to another, for example where the features associated with the telephone are stored in a central location, such as on the communications server 108.

At step 312, the user enters a password necessary for access to the communications system 100 (step 312). Assuming the entry of a valid password, the features of the user's desk telephone 124*b* are then made available to the user's PDA 124*a* (step 316).

According to an embodiment of the present invention, a transferred extension may be returned to the second communications device 124*b* automatically, after the first communications device disconnects or logs off from the LAN. In addition or alternatively, the transferred extension may be manually returned to the second communications device 124*b* in response to a command issued by the user, through the first 124*a* or second 124*b* devices, or by an administrator of the communications system 100.

From the above description, it can be appreciated that the present invention enables an encryption algorithm to be located in a central location, even when it is intended for use in connection with a number of distributed computers or communications devices 124 interconnected to one another by a computer network, such as a LAN 112. Accordingly, copies of the encryption algorithm does not need to be distributed to individual communications devices 124. The maintenance of the security algorithm in a central location provides improved system security by limiting the access of would be hackers to the code used to implement the encryption algorithm. In addition, the maintenance of the encryption algorithm in a central location, such as the security server 120, allows alterations to that algorithm to be made, without requiring changes to the software stored on individual communications devices 124. A method that includes altering the encryption algorithm may comprise altering the encryption algorithm in the security server. In addition, the method may include altering the decryption algorithm in the communications server to correspond to the altered encryption algorithm in the security server. Accordingly, a token passed to the security server by the first communications device and encrypted by the security server using the altered encryption algorithm and the identifying information entered at the first communications device can be decrypted by the communications server using the altered decryption algorithm. Also, the communications devices 124 are not required to implement the encryption algorithm, allowing stronger encryption algorithms than may otherwise be possible using the limited resources of certain communications devices 124 to be used.

As described above, the present invention is particular useful in connection with IP telephony associated with a private branch exchange. For example, using an embodiment of the present invention, a user may retain all the capabilities of that user's office desk telephone, even while the user is outside of their office. For example, the user may receive telephone calls placed to their extension, and conveniently access voice mail messages using a portable communications device wirelessly interconnected to the communications server 108. In addition, the user may access customized features, such as dialing directories, from the communications device to which the extension normally associated with the desk telephone has been transferred.

It should be appreciated that the present invention is not limited to transferring extensions to portable communications devices. For example, a system in accordance with the present invention may allow a user to access the features of their desk telephone from a telephone located in another office.

Although the present invention is described in connection with VoIP telephony, its application is not so limited. In particular, the present invention is useful in connection with any computer network, and in particular with any computer network to which a large number of individual devices may be interconnected. Accordingly, the communications device 124*a* may simply make a request to the application server 108 for access to the communications system 100 (in this case, a computer network). The passing of a token and encryption of that token by a security server 120 may then proceed as described above.

The ability of the present invention to allow a remote communications device 124 to access the features and identity of a telephone extension normally assigned to another communications device 124 also can be used to reduce telephone toll charges. For example, a user may request that the telephone extension of the user's desk telephone be transferred to a PDA even if the user is in a different country from where the desk telephone is located. All that is required is an Internet Protocol network connection with the communications server 108 and the server 120. Once the extension is successfully transferred, the PDA may be used to make telephone calls to numbers that are local to the desk telephone. Accordingly, it should also be appreciated that the present invention may be used in connection with wide area networks (WANs) or the public Internet.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. Embodiments described hereinabove are further intended to explain the best mode presently known of practicing the invention to enable others skilled in the art to utilize the invention in such or in other embodiments and with various modifications required by their particular application or use of the invention. It is intended that the appended claims be construed to include alternative embodiments to the extent permitted by the prior art.

What is claimed is:

1. A method for providing communications system security, comprising:

establishing communications between a first communications device and a communications server;

generating a token in said communications server;

providing said token to said first communications device;

entering identifying information in said first communications device;

establishing communications between said first communications device and a security server;

providing said identifying information and said token to said security server;

encrypting said token in said security server;

providing said encrypted token to said first communications device;

providing said encrypted token from said first communications device to said communications server;

receiving said encrypted token at said communications server;

decrypting said encrypted token received at said communications server; and determining at said communications server whether said decrypted token received at said communications server matches said token generated by said communications server.

2. The method of claim 1, wherein said security server utilizes said identifying information as an encryption key.

3. The method of claim 1, wherein said identifying information comprises at least one of a user identifier and a user password.

4. The method of claim 1, wherein said step of establishing communications comprises requesting that a communications extension assigned to a second communications device be transferred to said first communications device.

5. The method of claim 4, wherein in response to determining that said decrypted token received at said communications server matches said token generated by said communications server said request to transfer said communications extension to said first communications device is granted, wherein at least a first plurality of communications features available to a user through said second communications device when said second communications device is assigned to said extension are available to a user through said first communications device when said first communications device is assigned to said extension.

6. The method of claim 1, wherein said communications system comprises a private branch exchange telephony system.

7. The method of claim 1, wherein said first communications device comprises a personal digital assistant.

8. The method of claim 1, wherein said first communications device establishes communications with said communications server over a communications network comprising at least one of a wireless network, a wired network, and a switched voice data network.

9. The method of claim 1, wherein said step of providing said encrypted token to said communication server is performed after said encrypted token is received at said first communications device.

10. The method of claim 1, wherein said step of granting said first communications device access to said communication system comprises:

applying said encrypted token received at said communication server; and verifying that said decrypted token matches said encrypted token generated in said communications server.

11. The method of claim 1, wherein an encryption algorithm used in connection with determining whether to grant access to said communications system is not stored in said first communications device.

12. A method for providing communications system security, comprising:

establishing communications between a first communications device and a communications server;

generating a token in said communications server;

providing said token to said first communications device;

entering identifying information in said first communications device;

establishing communications between said first communications device and a security server;

providing said identifying information and said token to said security server;

encrypting said token in said security server;

providing said encrypted token to said first communications device;

providing said encrypted token to said communications server;

receiving said encrypted token at said communications server;

granting said first communications device access to said communications server;

altering an encryption algorithm in said security server; and altering a decryption algorithm in said communications server to correspond to said altered encryption algorithm in said security server, wherein a token passed to said security server by said first communications device and encrypted by said security server using said altered encryption algorithm and said identifying information can be decrypted by said communications server using said altered decryption algorithm.

13. A communications system providing remote security, comprising:
   a) a communications network;
   b) a system server, comprising:
      i) communication system software;
      ii) decryption software; and
      iii) a network interface interconnected to said communications network;
   c) a first communications device, comprising:
      i) communications device software;
      ii) a network interface interconnected to said communications network;
   d) a security server, comprising:
      i) encryption software; and
      ii) a network interface interconnected to said communications network, wherein said first communications device is in communication with said security server and with said system server, wherein said system server provides said first communications device with a first token, wherein said first communications device provides said first token to said security server, wherein said security server encrypts said first token, wherein said first communications device provides said encrypted first token to said system server, and wherein said first communications device is granted access to said system server in response to receipt by said system server of said encrypted first token.

14. The communications system of claim 13, wherein said communications network comprises at least one of a wireless computer network, a wired computer network, and a switched voice data network.

15. The communications system of claim 13, wherein said first communications device comprises at least one of a soft telephone and a hard telephone.

16. The communications system of claim 13, wherein said first communications device comprises a personal digital assistant.

17. The communications system of claim 13, wherein said first communications device is capable of providing a first set of functions provided by a second communications device comprising a hard telephone when said first communications device is granted access to said system server.

18. The communications system of claim 13, wherein an encryption algorithm for use in connection with said communications system is not stored on said communications device.

19. A communications system with security features remote from a communication device, comprising:

means for providing communications services to a plurality of communications devices, including said at least a first communications device and at least a second communications device, wherein said means for providing communications services includes means for generating a first token;

at least a first communications device interconnected to said means for providing communications services;

means for encrypting said first token interconnected to said at least a first communications device, wherein said first token is received by said means for encrypting from said at least a first communications device, wherein said means for encrypting are located remotely from said at least a first communications device, and wherein said at least a first communications device is operable to perform at least a first set of communications functions.

20. The communications system of claim 19, further comprising:

means for interconnecting said at least a second communications device to said means for providing communications services, wherein said at least a second communications device is operable to perform said at least a first set of communications functions, and wherein an extension assigned to said at least a second communications device is reassigned to said at least a first communications device.

21. The communication system of claim 19, wherein said means for interconnecting said at least a first communications device to said means for encrypting information and to said means for providing communications services comprises a wireless communications channel.

* * * * *